(12) United States Patent
Kim et al.

(10) Patent No.: US 7,664,301 B2
(45) Date of Patent: Feb. 16, 2010

(54) METHOD AND APPARATUS FOR ENHANCING IMAGE QUALITY OF A TWO-DIMENSIONAL ULTRASOUND IMAGE

(75) Inventors: Cheol An Kim, Yongin-si (KR); Young Seuk Song, Seoul (KR); Eun Ho Yang, Seoul (KR); Jong Beom Ra, Daejeon (KR); Yong Sun Kim, Daejeon (KR); Dong Hoon Yu, Gwangju (KR)

(73) Assignees: Medison Co., Ltd., Hongchun-gun (KR); Korea Advanced Institute of Science and Technology, Daejeon (KR)

( * ) Notice: Subject to any disclaimer, the term of this patent is extended or adjusted under 35 U.S.C. 154(b) by 593 days.

(21) Appl. No.: 11/198,174

(22) Filed: Aug. 8, 2005

(65) Prior Publication Data

US 2006/0084869 A1    Apr. 20, 2006

(30) Foreign Application Priority Data

Oct. 18, 2004    (KR)    ...................... 10-2004-0083120

(51) Int. Cl.
   *G06K 9/00*    (2006.01)
(52) U.S. Cl. ...................... 382/128; 382/276; 382/107; 382/190; 382/203
(58) Field of Classification Search ................ 600/437, 600/407; 382/128, 276; 128/661; 706/22; 73/626

See application file for complete search history.

(56) References Cited

U.S. PATENT DOCUMENTS

| 5,619,998 A * | 4/1997 | Abdel-Malek et al. ...... 600/437 |
| 6,561,980 B1 * | 5/2003 | Gheng et al. ................ 600/443 |
| 2004/0008904 A1 * | 1/2004 | Lin et al. .................... 382/275 |

OTHER PUBLICATIONS

Abou-Bakr M. Youssef, IEEE transactions on biomedical engineering, vol. 49, No. 9, Sep. 2002 "Real-time speckle reduction and coherence enhancement in ultrasound imaging via nonlinear anisotropic diffusion".*

* cited by examiner

*Primary Examiner*—Long V Le
*Assistant Examiner*—Joel F Brutus
(74) *Attorney, Agent, or Firm*—Oblon, Spivak, McClelland, Maier & Neustadt, L.L.P.

(57) ABSTRACT

The present invention relates a method and an apparatus for enhancing ultrasound image quality through a post-processing. A method for enhancing an image quality of a two-dimensional (2D) ultrasound image, comprises the steps of: a) decomposing the 2D ultrasound image into a plurality of images having a multi-resolution by N levels, wherein N is a positive integer; b) determining characteristics of each pixel in the decomposed image; c) performing an enhancement process for the decomposed image based on the pixel characteristics; d) performing $1^{st}$-level composition for the decomposed image; and e) repeatedly performing steps b) to d) until a size of the composed image is identical to that of the 2D ultrasound image.

12 Claims, 2 Drawing Sheets

METHOD AND APPARATUS FOR ENHANCING IMAGE QUALITY OF A TWO-DIMENSIONAL ULTRASOUND IMAGE

FIELD OF THE INVENTION

The present invention generally relates to an ultrasound diagnostic device, and more particularly to a method and an apparatus for enhancing the image quality of an ultrasound image in an ultrasound diagnostic device.

BACKGROUND OF THE INVENTION

An ultrasound diagnostic device is used in various medical fields. The ultrasound diagnostic device is adapted to transmit ultrasound signals to organs and acquire an ultrasound image by detecting the ultrasound signals that reflect from the organs. When the ultrasound signals are transmitted to the organs, the reflection and scattering of the ultrasound signals occur at the same time, thus generating a speckle noise. The speckle noise degrades not only the ultrasound image quality but also the accuracy of displaying important parts such as the boundary between a target object and a background. Also, the speckle noise makes it difficult to analyze the ultrasound image and to distinguish different types of organs from the ultrasound image.

In order to resolve the above-identified problems, a method for removing the speckle noise has been sought and researched in the art. Currently, the most widely used method for removing the speckle noise is to apply a heat equation. According to this method, the pixels of an ultrasound image are segmented into a plurality of areas wherein an appropriate Gaussian filtering for each area is carried out, thereby removing the speckle noise. Also, the speckle noise can be removed by applying a non-linear threshold to each frequency in the ultrasound image on the basis of wavelet. However, since the ultrasound image removing the speckle noise according to the conventional methods produces uncomfortable and unnatural feelings, it is not useful for application in a clinical setting. Also, when the ultrasound image removing the speckle noise according to the conventional methods is displayed on a display unit, a problem typically arises in which the boundaries of organs are not clearly displayed.

SUMMARY OF THE INVENTION

It is an object of the present invention to provide a method and an apparatus for enhancing the image quality of a two-dimensional (2D) ultrasound image by efficiently removing the speckle noise and conspicuously displaying the boundaries of organs.

In accordance with an aspect of the present invention, there is provided a method for enhancing the image quality of a two-dimensional (2D) ultrasound image. The method comprises the following steps: a) decomposing the 2D ultrasound image into a plurality of images having multi-resolution by N levels, wherein N is a positive integer; b) determining characteristics of each pixel in the decomposed image; c) performing an enhancement process for the decomposed image based on the pixel characteristics; d) performing 1-level composition for the decomposed image; and e) repeatedly performing steps b) to d) until a size of the composed image is identical to that of the 2D ultrasound image.

In accordance with another aspect of the present invention, there is provided an apparatus for enhancing the image quality of a two-dimensional (2D) ultrasound image. The apparatus comprises the following elements: a decomposition unit for decomposing the 2D ultrasound image into a plurality of images having multi-resolution by N levels, wherein N is a positive integer; a determination unit for determining characteristics of each pixel in the decomposed image; an enhancement unit for enhancing the decomposed image according to the pixel characteristics; and a composition unit for performing an N-level composition for the decomposed image.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PRESENT INVENTION

Figure 1:
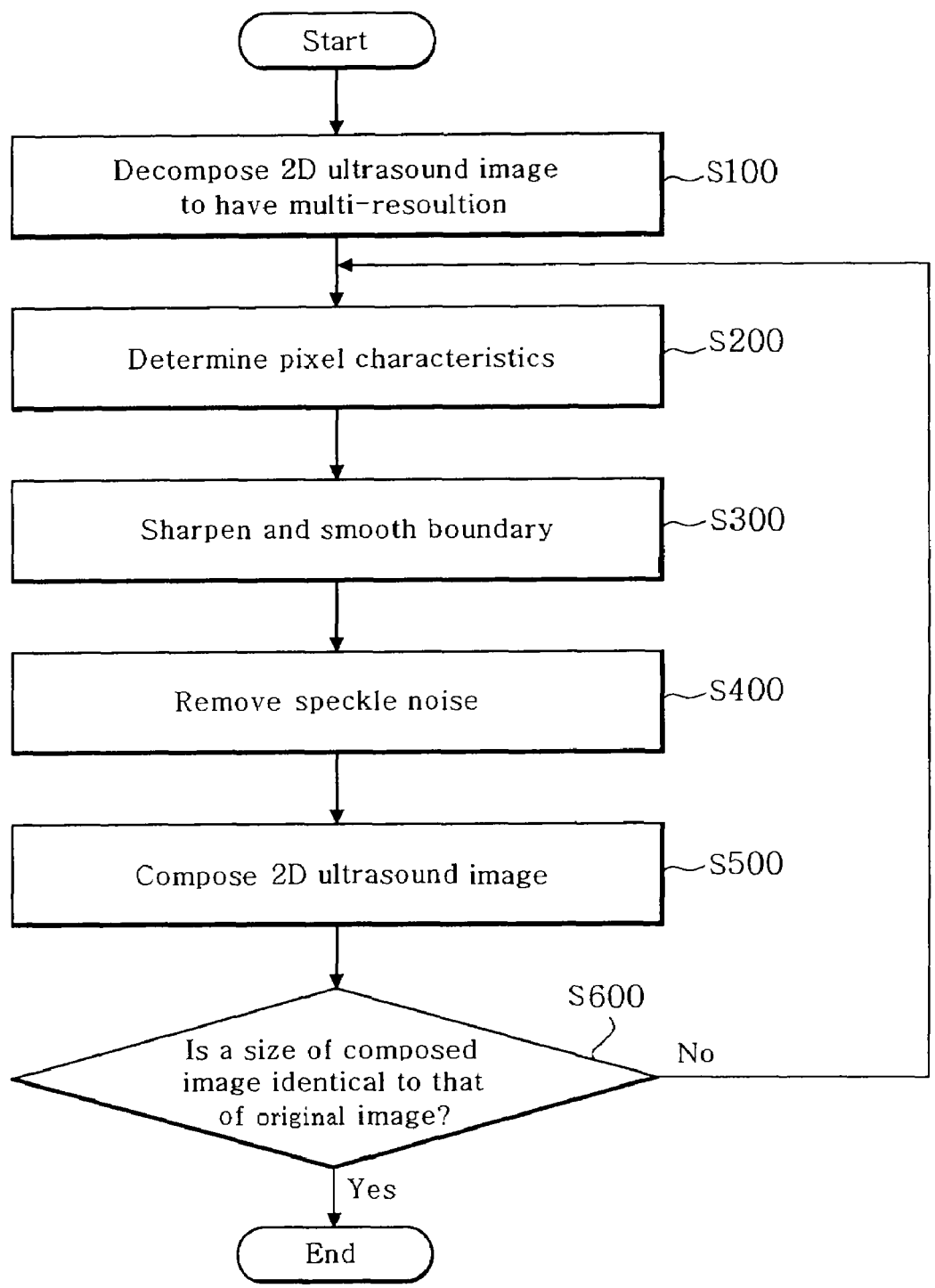
FIG. 1 is a flow chart showing a process for enhancing an image quality of a 2-dimensional (2D) ultrasound image through a post-processing in accordance with the present invention.

FIG. 1 is a flow chart showing a process for enhancing an image quality of a 2-dimensional (2D) ultrasound image through a post-processing in accordance with the present invention.

Referring to FIG. 1, an ultrasound image is decomposed to obtain a multi-resolution at step S100. The ultrasound image may be an image before or after performing a scan conversion process. The multi-resolution analysis is carried out by decomposing an arbitrary image into a plurality of images having a multi-resolution and analyzing the decomposed images. A high frequency component and a low frequency component in the ultrasound image can be obtained through the multi-resolution analysis. In order to obtain the image having the multi-resolution, the wavelet transform and Laplacian pyramid code may preferably be used. In accordance with the present invention, any image decomposition method can be applied to obtain the image having the multi-resolution. Further, the decomposition process can be carried out by N levels, wherein N is a positive integer.

Hereinafter, the decomposition method using N-level wavelet transform for the ultrasound image will be described in detail as an example in accordance with the present invention. After the $1^{st}$-level wavelet transform is performed, the images of the low frequency component and the high frequency component, wherein each image corresponds to a $2^{-1}$ size of an original image, can be obtained. Also, the images of the low frequency component and the high frequency component, wherein each image corresponds to a $2^{-2}$ size of the original image, can be obtained through the $2^{nd}$-level wavelet transform. By repeating the wavelet transform by N, the images of the low frequency component and the high frequency component, wherein each image corresponds to a $2^{-N}$ size of the original image, can be obtained.

Pixels of the image of the low frequency component, among the images decomposed through the N-level wavelet transform, are segmented according to pixel characteristics at step S200. In order to segment the pixels of the image of the low frequency component, it must be determined whether each pixel of the image corresponds to a boundary of organs, a speckle, or a plate area according to the pixel characteristics.

First, after computing an eigenvalue and an eigenvector of a predetermined range of pixels (e.g., 5×5 or 10×10) with linear algebra used in the pertinent art, a tangential direction vector and a normal direction vector of each pixel are computed by using the eigenvalue and the eigenvector. Thereafter, a magnitude difference between the tangential direction vector and the normal direction vector is compared with a threshold value. Then, the pixel characteristics are determined according to the comparison result.

That is, if the magnitude difference between the tangential direction vector and the normal direction vector is greater than the threshold value, then this means that a magnitude component of one of the vectors is dominant in one direction such that it is determined that the pixel corresponds to the boundary of the organs. On the other hand, if the magnitude difference between the tangential direction vector and the normal direction vector is smaller than the threshold value, then this means that there are no dominant magnitude components in any direction. If a certain pixel is a speckle, since magnitudes of the two vectors are largely represented in every direction, a magnitude difference between the tangential direction vector and the normal direction vector becomes smaller than the threshold value. Also, if a certain pixel is a plate area, since the two vectors are represented as a small vector in every direction, a magnitude difference between the tangential direction vector and the normal direction vector becomes smaller than the threshold value.

Through the above process, the tangential direction vector and the normal direction vector in each pixel are extracted so that it can be determined whether the pixel corresponds to the boundary of the organs, the speckle or the plate area.

An enhancement process for a portion determined to be the boundary of the organs at step S200 is carried out at step S300. A smoothing process is carried out in a tangential vector direction so as to enhance the continuity of the boundary. Then, a sharpening process is carried out to make the boundary clear in the normal vector direction. The sharpening process can be implemented through a low-pass filtering process performed only in a tangential direction of the boundary.

Figure 2A:
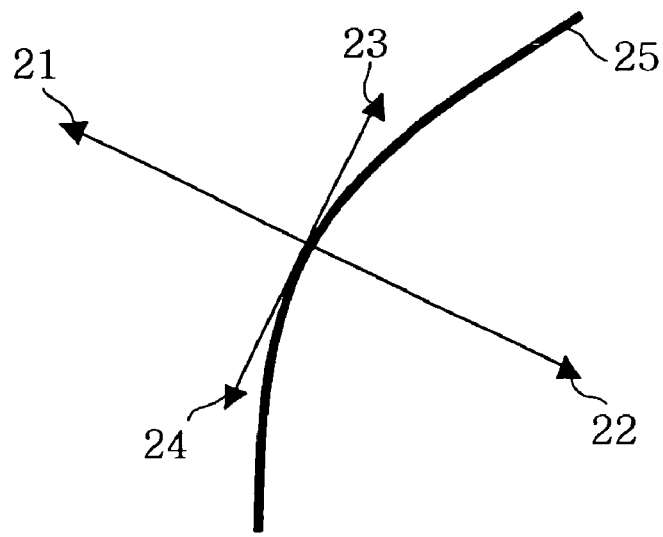
FIG. 2A is a diagram illustrating an eigenvector at a boundary.
Figure 2B:
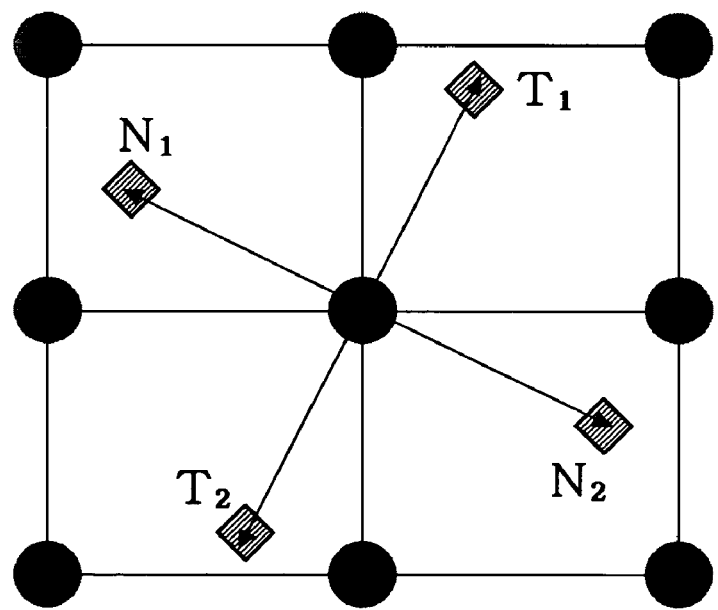
FIG. 2B is a schematic diagram illustrating an enhancement process in accordance with the present invention.

FIGS. 2A and 2B are diagrams illustrating the enhancement process in accordance with the present invention. After decomposing the ultrasound image to obtain the multi-resolution through the wavelet transform, the eigenvector and the eigenvalue are computed for each pixel. Then, the tangential direction vectors 23 and 24 and the normal direction vectors 21 and 22 are represented at an arbitrary pixel, as shown in FIG. 2A.

Next, the scalar values T1 and T2 in a tangential direction of a boundary 25, which are magnitudes of the vectors 23 and 24 in a tangential direction, are computed through linear interpolation. Also, the scalar values N1 and N2 in a normal direction of boundary 25, which are magnitudes of the vectors 21 and 22, are computed in the same manner.

Thereafter, the directional smoothing process is carried out in the tangential direction of the boundary by using the scalar values T1 and T2 so as to enhance the continuity of the boundary. Then, the directional sharpening process is carried out in the normal direction of the boundary by using the scalar values N1 and N2 so as to render the boundary clear. The enhancement process can be represented by the following equation:

$$I'(x,y)=(1-2t+2n)\cdot I(x,y)+t\cdot(T1+T2)-n\cdot(N1+N2) \quad \text{Eq. 1}$$

Wherein, I'(x,y) represents the pixel values after performing the filtering process; I(x,y) represents the pixel values before performing the filtering process; T1 and T2 represent the magnitudes of tangential direction vectors at the pixel; N1 and N2 represent the magnitudes of normal direction vectors at the pixel; t represents the degree of directional smoothing; and n represents the degree of directional sharpening.

The speckle is removed or reduced at step S400. Step S400 is applied to pixels determined as a speckle or a plate area at step S200. The speckle can be reduced by applying low pass filtering to the pixels. Also, when using the wavelet transform, the speckle can be reduced by decreasing the coefficients of the high frequency components at the pixels.

A low-resolution image enhancing the boundary and reducing the speckle is obtained through steps 100 to S400. The $1^{st}$-level composition process for the low-resolution image is carried out at step S500. When the wavelet transform is carried out by N levels for the original image, the image has a $2^{-N}$ size of the original image. If an inverse wavelet transform of $1^{st}$-level is carried out for the decomposed image after carrying out steps S200 to S400, a filtered image having a $2^{-(N-1)}$ size of the original image is obtained.

Thereafter, it is determined whether a size of the image composed at step S500 is identical to that of the original image at step S600. If the size of the composed image is not identical to that of the original image, then steps S200 to S500 are repeated until the size of the composed image is identical to that of the original image. That is, if the decomposition process is carried out by N times, then steps S200 to S500 are repeatedly performed by N times. Therefore, an ultrasound image, the boundary of which becomes clearer and in which the speckle noise is removed, can be obtained.

As described above, after the process for sharpening a portion determined as the boundary is carried out at step S300, the process for removing the speckle noise is carried out at step S400. Also, the process for removing the speckle noise can be performed prior to the process for sharpening a portion determined as the boundary.

The present invention can be applied to a 2-dimensional ultrasound image such as a 2-dimensional B mode image representing an arbitrary slice in a 3-dimensional image or the like.

While the present invention has been described and illustrated with respect to a preferred embodiment of the invention, it will be apparent to those skilled in the art that variations and modifications are possible without deviating from the broad principles and teachings of the present invention which should be limited solely by the scope of the claims appended hereto.

What is claimed is:

1. A method for enhancing an image quality of a two-dimensional (2D) ultrasound image, comprising:

acquiring a 2D ultrasound image using an ultrasound diagnostic device decomposing the 2D ultrasound image into a plurality of images having a multi-resolution by N levels, wherein N is a positive integer;

computing a tangential direction vector and a normal direction vector of each pixel in the decomposed image, comparing a magnitude difference between the tangential direction vector and the normal direction vector with a threshold value, and determining characteristics of each pixel in the decomposed image based on the comparison result;

enhancing the decomposed image based on the pixel characteristics;

composing $1^{st}$-level composition for the decomposed image; and repeatedly performing the computing, enhancing, and composing steps until a size of the composed image is identical to that of the 2D ultrasound image.

2. The method as recited in claim 1, wherein:
the decomposing step is carried out by using a wavelet transform or a Laplacian pyramid code.

3. The method as recited in claim 1, wherein the computing step further includes:
computing an eigenvector and an eigenvalue of a predetermined range of pixels in the decomposed image, wherein the tangential vector and the normal direction vector are computed by using the eigenvector and the eigenvalue.

4. The method as recited in claim 3, wherein the enhancing step further includes:
directionally smoothing pixels determined as a boundary at the computing step; and
directionally sharpening the boundary pixels.

5. The method as recited in claim 4, wherein the enhancing step further includes:
reducing speckles for pixels determined as a speckle at the computing step.

6. The method as recited in claim 4, wherein the enhancing step is carried out with the following equation:

$$I'(x,y)=(1-2t+2n)\cdot I(x,y)+t\cdot(T1+T2)-n\cdot(N1+N2)$$

wherein, I'(x,y) represents pixel values after performing the filtering process; I(x,y) represents pixel values before performing the filtering process; T1 and T2 represent magnitudes of tangential direction vectors at the pixel; N1 and N2 represent magnitudes of normal direction vectors at the pixel; t represents a degree of directional smoothing; and n represents a degree of directional sharpening.

7. An apparatus for enhancing an image quality of a two-dimensional (2D) ultrasound image, comprising acquiring a 2D ultrasound image using an ultrasound diagnostic device:
a decomposition unit configured to decompose the 2D ultrasound image into a plurality of images having a multi-resolution by N levels, wherein N is a positive integer;
a determination unit configured to compute a tangential direction vector and a normal direction vector of each pixel in the decomposed image and compare a magnitude difference between the tangential direction vector and the normal direction vector with a threshold value, the determination unit being further configured to determine characteristics of each pixel in the decomposed image based on the comparison result;
an enhancement unit configured to enhance the decomposed image according to the pixel characteristics; and
a composition unit configured to perform an N-level composition for the decomposed image.

8. The apparatus as recited in claim 7, wherein the decomposition unit uses a wavelet transform or a Laplacian pyramid code.

9. The apparatus as recited in claim 7, wherein the determination unit is further configured to compute an eigenvector and an eigenvalue of a predetermined range of pixels in the decomposed image, wherein the tangential vector and the normal direction vector are computed by using the eigenvector and the eigenvalue.

10. The apparatus as recited in claim 9, wherein the enhancement unit further includes:
a directional smoothing unit configured to perform a directional smoothing process for pixels determined as a boundary at the determining unit; and
a directional sharpening unit configured to perform a directional sharpening process for the boundary pixels.

11. The apparatus as recited in claim 10, wherein the enhancement unit further includes a speckle reducing unit configured to reduce speckles for pixels determined as a speckle at the determining unit.

12. The apparatus as recited in claim 10, wherein the enhancement unit is configured to carry out the following equation:

$$I'(x,y)=(1-2t+2n)\cdot I(x,y)+t\cdot(T1\,T2)-n\cdot(N1+N2)$$

wherein, I'(x,y) represents pixel values after performing the filtering process; I(x,y) represents pixel values before performing the filtering process; T1 and T2 represent magnitudes of tangential direction vectors at the pixel; N1 and N2 represent magnitudes of normal direction vectors at the pixel; t represents a degree of directional smoothing; and n represents a degree of directional sharpening.

* * * * *